US006314276B1

(12) United States Patent
Hilgers et al.
(10) Patent No.: US 6,314,276 B1
(45) Date of Patent: *Nov. 6, 2001

(54) TRANSMITTED-RECEIVER

(75) Inventors: Achim Hilgers; Frank Heinrichs; Rebekka Porath, all of Aachen (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,541

(22) Filed: Aug. 6, 1999

(30) Foreign Application Priority Data

Aug. 17, 1998 (DE) ............................................ 198 36 952

(51) Int. Cl.$^{7}$ ............................... H04B 1/38; H01Q 1/24

(52) U.S. Cl. ............................................ 455/90; 343/702

(58) Field of Search .................................... 455/550, 553, 455/552, 78, 73, 121, 103, 101, 132, 269, 272; 343/702, 700 MS, 785, 725, 742

(56) References Cited

U.S. PATENT DOCUMENTS

| | | | | |
|---|---|---|---|---|
| 5,557,293 | | 9/1996 | McCoy et al. | 343/867 |
| 6,011,516 | * | 1/2000 | Minegishi et al. | 343/702 |
| 6,043,786 | * | 3/2000 | Vannatta et al. | 343/700 MS |
| 6,147,647 | * | 11/2000 | Tassoudji et al. | 343/700 MS |

FOREIGN PATENT DOCUMENTS

| | | | |
|---|---|---|---|
| 0481986B1 | 4/1992 | (EP) | H01Q/1/52 |
| 0801436A2 | 4/1998 | (EP) | H01Q/9/04 |
| 2754942A1 | 4/1998 | (FR) | H01Q/13/00 |
| WO9101048 | 1/1994 | (WO) | H01Q/1/22 |

OTHER PUBLICATIONS

By Fan, Z. et al.: Entitled: Slot–Coupled DR Antenna for Dual–Frequency Operation. In: IEEE Transactions on Antennas and Propagation, vol. 45, No. 2, Feb. 1997, pp. 306–308.

By Rasinger J. et al.: Entitled: Interne Antennen Fur Schnurlostelefone. In: NTZ BD. 43 (1990) Heft 5, pp. 376–379.

Derwent Abstract Accession No. 2000–081788/07, Class U23, JP 11–330818, A (Murata Mfg Co Ltd) Nov. 30, 1999.

Derwent Abstract Accession No. 1999–450578/38, Class W02, JP 11–186805 A (Sumitomo Metal Co) Jul. 9, 1999.

* cited by examiner

*Primary Examiner*—Tracy Legree
(74) *Attorney, Agent, or Firm*—Dicran Halajian

(57) ABSTRACT

A transmitter-receiver for four different frequency ranges of two transmission systems has four dielectric resonator antennas (DRAs) for each frequency range to improve and a simplify separation of different frequency ranges. Two DRA's are provided for reception and transmission in the first transmission system, and two other DRA's are provided for reception and transmission in the second transmission system.

2 Claims, 1 Drawing Sheet

TRANSMITTED-RECEIVER

FIELD OF THE INVENTION

The invention relates to a transmitter-receiver for at least two frequency ranges, in which at least one antenna arrangement is provided for each frequency range.

Furthermore, the invention relates to a mobile radiotelephone including such a transmitter-receiver.

BACKGROUND OF THE INVENTION

Transmitter-receivers for at least two different frequency ranges are used, for example, for cordless telephones or in the mobile radio domain. The various frequency ranges then relate to, for example, the transmission frequency band and reception frequency band. FIG. 1 shows a circuit diagram of a transmitter-receiver in a mobile radiotelephone. An antenna 1 is used then for transmitting and receiving data. To avoid a transmit signal ending up in the receiver channel 2, the transmitter channel 3 and the receiver channel 2 are to be separated. For this purpose, a duplex filter 4 may be used which comprises two sharp-edged bandpass filters 5 and 6. A bandpass filter 5 is then tuned to the reception frequency band and the other filter 6 to the transmission frequency band. As a result, a transmit signal does reach antenna 1, because the filter 6 has little attenuation for the transmission frequency, but does not reach the receiver channel 2, because the filter 5 blocks this frequency band. A received signal from the antenna 1 is only slightly attenuated by the bandpass filter 5 and thus reaches the receiver channel 2, whereas it is strongly attenuated by the filter 6. Consequently, the duplex filter 4 is to have very small transit losses and a very sharp-edged filter behavior. Furthermore, an active electronic switch 7 (for example, realized by means of PIN diodes) may be used for separating the transmitter channel 3 and receiver channel 2 on the antenna 1, as is represented in FIG. 2. This type of changeover needs an additional control signal for the switch 7, which is to be generated in a costly manner. Furthermore, very strict requirements are made on the switches because very fast switching is to be realized. Furthermore, filters are to be provided which filter the respective frequency band for the transmitter channel 3 and receiver channel 2.

European patent application EP 0 481 986 has disclosed a communication radiotelephone which contains the transmitter and the receiver in one and the same housing, having a first antenna connected to the transmitter and tuned to the transmitter, and a second antenna connected to the receiver and tuned to the receiver, while the two antennas are separated from each other. The communication radiotelephone comprises a housing accommodating a transmitter and a receiver. The communication radiotelephone can transmit and receive simultaneously. A first antenna is connected to the receiver and a second antenna to the transmitter, while the transmitter and the receiver operate in different frequencies. The antennas tuned to the different frequencies are each connected to the receiver and transmitter, respectively via a filter. A separation of transmitter and receiver channel is then achieved in that the transmitting and receiving antennas have asymmetrical radiation characteristics and the position of the radiation characteristic is selected such that the antenna effect is always turned away from the transmitter and receiver. This, however, is highly disadvantageous in devices for transmission systems transmitting and receiving in the same direction. Furthermore, in most cases corresponding radiation characteristics for transmission and reception in a certain direction are required and/or desired.

SUMMARY OF THE INVENTION

For this purpose, it is an object of the invention to provide a better transmitter-receiver having a simpler separation of different frequency ranges.

According to the invention, the object is achieved in that at least a dielectric resonator antenna (DRA) is provided for forming at least an antenna arrangement. Due to its physical properties a dielectric resonator antenna is operable only in a narrow frequency band around its resonant frequency. Therefore, an antenna arrangement formed by a dielectric resonator antenna has a very narrow frequency band, with which a very good separation of different frequency ranges, for example, for transmission and reception, is achieved. By changing the geometry or other parameters of the DRA, the resonant frequency and the bandwidth can be adapted to the requirements of different transmission systems regarding the frequency ranges to be adhered to.

In a preferred embodiment of the invention, a first antenna is arranged for reception in a first frequency range and a second antenna for transmission in a second frequency range. This embodiment is highly suitable for use in a transmission system having different frequency ranges for transmission and reception, such as, for example, GSM900, GSM1800, DECT and so on.

A further advantageous embodiment of the invention is provided when a first antenna is arranged for reception (or transmission) in a frequency range in a first transmission system and a second antenna for reception (or transmission) in a frequency range in a second transmission system. With this arrangement, the transmitter-receiver may be operated simultaneously in different transmission systems. It is alternatively possible to use more than two antennas, so that more frequency ranges may be used. In addition, further, combinations of various antennas for different frequency ranges of various transmission systems in one transmitter-receiver are conceivable.

Furthermore, the object of the invention is achieved by a mobile radiotelephone including a transmitter-receiver, which includes at least a dielectric resonator antenna (DRA) for forming at least one antenna arrangement.

These and other aspects of the invention are apparent from and will be elucidated, by way of non-limiting example, with reference to the embodiments described hereinafter.

DETAILED DESCRIPTION OF THE INVENTION

Figure 1:
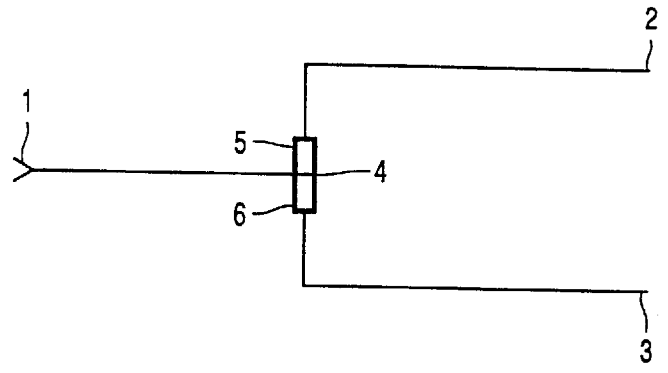
FIG. 1 shows a circuit diagram of a transmitter-receiver with a duplex filter.
Figure 2:
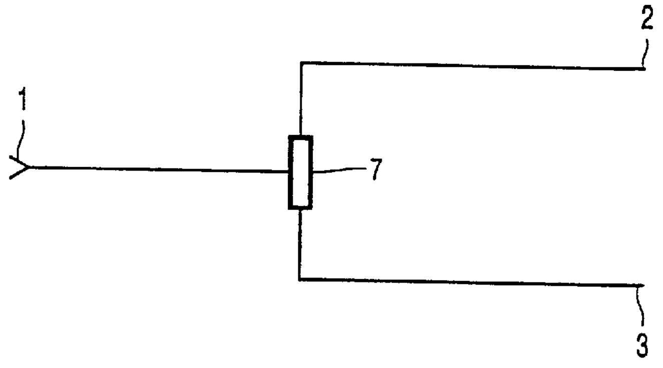
FIG. 2 shows a circuit diagram of a transmitter-receiver with an electronic switch.
Figure 3:
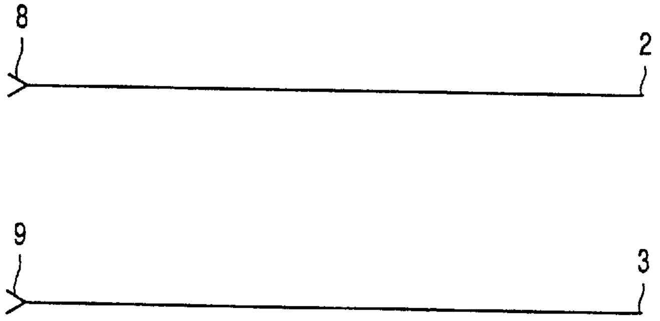
FIG. 3 shows a circuit diagram of a transmitter-receiver according to the invention.

FIG. 3 shows a transmitter-receiver that includes a receiver channel 2 with a receiving antenna 8 and a transmitter channel 3 with a transmitting antenna 9. As receiving antenna 8 and transmitting antenna 9 are used dielectric resonator antennas (DRA) which distinguish themselves by a high degree of miniaturization and the possibility of surface mounting (SMD technique). Furthermore, a DRA, because of its physical properties, has a very narrow frequency band (only operable in a very narrow frequency band around the resonant frequency). The dielectric resonator antenna comprises a dielectric body (usually ceramic) deposited on a metallized surface. However, also other antennas having such properties may be used, such as, for example, a microstrip antenna for which a conductive structure is deposited as a radiating element on a (mostly dielectric) substrate, while a conductive layer on the back of the substrate forms the reference potential. The transmitting antenna 9 is tuned to the transmitter frequency and the receiving antenna 8 to the receiver frequency. Due to the narrow-band properties, no further filters are necessary for separating receiver channel 8 and transmitter channel 9. The respective frequency ranges may be tuned to by a special design of the radiating elements of the dielectric substrate (resonator) or the way in which the signal is supplied. The signal is mostly supplied via a coaxial line or a microstrip line.

Clearly narrower bandwidths may be achieved with a transmitter-receiver having a receiving antenna 8 and a transmitting antenna 9 which may each be realized by a dielectric resonator antenna. For a transmitter-receiver to operate in different frequency ranges, it is especially important to have a limitation of each respective bandwidth. This avoids a disturbance of a channel by a signal in another channel (for another frequency range). Since the antennas 8 and 9 used in the transmitter-receiver according to the invention have a very narrow frequency band, additional filters may be omitted.

Figure 4:
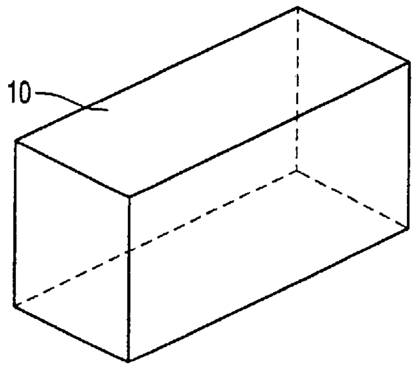
FIG. 4 shows a dielectric resonator antenna to be used in a transmitter-receiver according to the invention.

In FIG. 4 is represented a DRA 10 in its basic form to be regarded as an example. Besides the form of a parallelepiped, other forms are also possible, such as, for example, cylindrical or spherical geometry. Dielectric resonator antennas are resonant components that work only in a narrow band around one of their resonant frequencies. The resonant frequency of the DRA 10 depends on the dimensions of the DRA 10. In order to obtain the smallest possible dimensions, mostly the lowest resonance ($Te^{z}_{111}$-mode) is used. The DRA 10 shown is realized by means of a parallelepiped having dimensions 40×40×7.6 $mm^3$ of a (Ba,Nd, Gd)$TiO_3$ ceramic. This material is suitable for high frequencies, has a dielectric constant of about $\epsilon_r$=–85, low dielectric losses of tan $\delta=4\times10^{-4}$ and a low dielectric temperature coefficient of $\tau_\epsilon$=–30 ppm/° C. (NPO characteristic). The operating frequency of the DRA 10 lies at 1 GHz in its lowest resonance ($TE^{z}_{111}$-mode). For different dimensions the resonant frequency is shifted. Typical dimensions for a DRA 10 having an operating frequency of about 1.9 GHz (DECT) lie at about 20×20×6 $mm^3$.

Highly suitable is such a transmitter-receiver for mobile radio telephony in which different frequency ranges are used for transmission and reception (for example, according to GSM the frequency ranges 890–915 MHz and 935–960 MHz for transmission and reception, respectively). Furthermore, cordless telephones according to DECT, mobile radiotelephones for DCS1800 and PHS and devices for other transmission systems utilizing different frequency ranges in one device, may be fields of application. Also conceivable are combined devices operating in more than one transmission systems.

What is claimed is:

1. A transmitter-receiver for at least four different frequency ranges of a first transmission system and a second transmission system, comprising at least four antenna arrangements for each of said at least four different frequency ranges, wherein at least four dielectric resonator antennas (DRAs) are provided for forming said at least four antenna arrangements, a first DRA of said at least four DRAs being configured for reception in a first one of said four different frequency ranges in said first transmission system, a second DRA of said at least four DRAs being configured for transmission in a second one of said four different frequency ranges in said first transmission system, a third DRA of said at least four DRAs being configured for reception in a third one of said four different frequency ranges in said second transmission system, a fourth DRA of said at least four DRAs being configured for transmission in a fourth one of said four different frequency ranges in said second transmission system.

2. A mobile radiotelephone including a transmitter-receiver for at least four different frequency ranges in which at least four antenna arrangements are provided for each of said at least four frequency ranges, wherein at least four dielectric resonator antennas (DRAs) are provided for forming said at least four antenna arrangements, a first DRA of said at least four DRAs being configured for reception in a first one of said four different frequency ranges in said first transmission system, a second DRA of said at least four DRAs being configured for transmission in a second one of said four different frequency ranges in said first transmission system, a third DRA of said at least four DRAs being configured for reception in a third one of said four different frequency ranges in said second transmission system, a fourth DRA of said at least four DRAs being configured for transmission in a fourth one of said four different frequency ranges in said second transmission system.

* * * * *